(12) United States Patent
Sano et al.

(10) Patent No.: US 6,972,800 B2
(45) Date of Patent: Dec. 6, 2005

(54) SOLID STATE IMAGING APPARATUS FOR A VIDEO CAMERA CAPABLE OF INDEPENDENTLY PERFORMING A KNEE POINT ADJUSTMENT AND A GAIN CONTROL

(75) Inventors: Toshiyuki Sano, Yokohama (JP); Makoto Sube, Yokohama (JP); Masayuki Kamiya, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 09/759,257

(22) Filed: Jan. 16, 2001

(65) Prior Publication Data

US 2001/0008419 A1    Jul. 19, 2001

(30) Foreign Application Priority Data

Jan. 14, 2000    (JP)    ............................. 2000-005516

(51) Int. Cl.[7] ........................................... H04N 5/235
(52) U.S. Cl. .................................... 348/362; 348/229.1
(58) Field of Search .......................... 348/229.1, 362, 348/363, 364, 255, 678, 683

(56) References Cited

U.S. PATENT DOCUMENTS

| | | | | |
|---|---|---|---|---|
| 5,194,960 A | * | 3/1993 | Ota | 348/362 |
| 5,455,621 A | * | 10/1995 | Morimura | 348/229.1 |
| 5,729,287 A | | 3/1998 | Morimoto | |
| 6,141,047 A | * | 10/2000 | Kawai et al. | 348/254 |
| 6,204,881 B1 | * | 3/2001 | Ikeda et al. | 348/362 |
| 2001/0001245 A1 | * | 5/2001 | Kamishima et al. | 348/229 |

FOREIGN PATENT DOCUMENTS

| | | |
|---|---|---|
| EP | 0 912 047 | 4/1999 |
| JP | 3-106269 | 5/1991 |

* cited by examiner

Primary Examiner—David L. Ometz
Assistant Examiner—Heather R. Long
(74) Attorney, Agent, or Firm—Connolly Bove Lodge & Hutz LLP

(57) ABSTRACT

A period for a long-term exposure signal is discriminated from a period for a short-term exposure signal. Based on a discrimination signal, an AGC gain selector switches a set value for the gain and a knee point selector switches a set value for the knee point, thereby independently controlling the gain and the knee point for each of the long-term exposure signal and the short-term exposure signal.

7 Claims, 4 Drawing Sheets

SOLID STATE IMAGING APPARATUS FOR A VIDEO CAMERA CAPABLE OF INDEPENDENTLY PERFORMING A KNEE POINT ADJUSTMENT AND A GAIN CONTROL

BACKGROUND OF THE INVENTION

The present invention relates to a solid state imaging apparatus which is preferably used for a video camera or the like. More specifically, the present invention relates to a knee point control as well as a gain control for the solid state imaging apparatus.

Unexamined Japanese Patent publication No. 3-106269 discloses a conventional video signal processing apparatus for a video camera which controls the characteristics of γ correction and knee compression for a video signal supplied from an image sensor based on a rate of pixels of the image sensor which exceed a predetermined level of the dynamic range.

SUMMARY OF THE INVENTION

An object of the present invention is to provide a solid state imaging apparatus capable of improving image quality of a video signal while improving the dynamic range performance.

To accomplish the above and other related objects, the present invention provides a solid state imaging apparatus comprising an image pickup means for alternately outputting two kinds of video signals within a period of field, the two kinds of video signals being a long-term exposure signal having a long exposure time and a short-term exposure signal having a short exposure time, and a mixing means for mixing the long-term exposure signal and the short-term exposure signal at a predetermined brightness level, wherein a setting means is provided for independently setting a gain and a knee point for each of the long-term exposure signal and the short-term exposure signal. Mixing the long-term exposure signal and the short-term exposure signal makes it possible to enlarge the dynamic range. Providing the capability of independently setting the gain and the knee point for each of the long-term exposure signal and the short-term exposure signal makes it possible to improve the gradation of a mixing portion of the mixed signal.

Furthermore, according to the solid state imaging apparatus of the present invention, it is preferable that the setting means for independently setting the gain and the knee point for each of the long-term exposure signal and the short-term exposure signal comprises a long-term/short-term discrimination pulse generator which generates a signal discriminating between a period for the long-term exposure signal and a period for the short-term exposure signal, a gain setting means for setting a gain, and a knee point setting means for setting a knee point. A set value for the gain of the gain setting means and a set value for the knee point of the knee point setting means are respectively selected based on the discrimination signal generated from the long-term/short-term discrimination pulse generator, thereby independently setting the gain and the knee point for each of the long-term exposure signal and the short-term exposure signal. This arrangement makes it possible to arbitrarily setting the gain and the knee point for each of the long-term exposure time and the short-term exposure time by using a single system consisting of a gain adjusting circuit a knee point setting circuit.

Furthermore, according to the present invention, it is preferable that the solid state imaging apparatus further comprises a means for detecting an average brightness value for the short-term exposure signal, and a microcomputer for performing an algorithm which is used to calculate the gain and the knee point based the detected average brightness value of the short-term exposure signal. This arrangement makes it possible to automatically setting the gain and the knee point to optimum values in accordance with the condition of the short-term exposure image.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

Hereinafter, knee processing and a gain control of a fundamental solid-state image pickup device will be explained.

Figure 4:
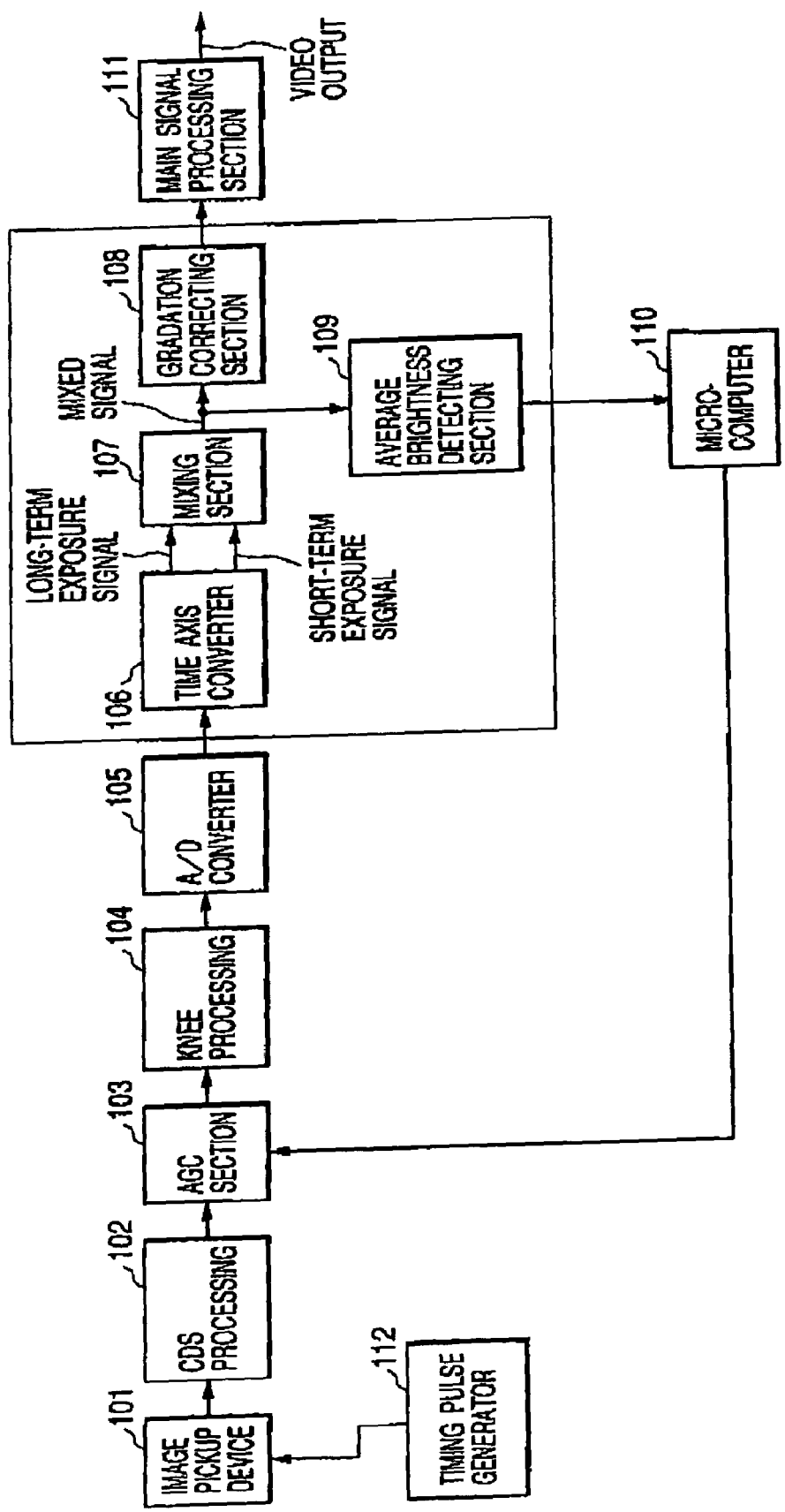
FIG. 4 is a diagram showing an arrangement for a fundamental solid state imaging apparatus.

FIG. 4 is a diagram showing an arrangement for a fundamental solid state imaging apparatus using a double-speed driven image pickup device.

In FIG. 4, an image pickup device 101 alternately outputs two kinds of video signals within a period of field at a transmission rate of a horizontal CCD which is two times an ordinary value. Of the two kinds of video signals produced from the image pickup device 101, one is a long-term exposure signal having a long exposure time and the other is a short-term exposure signal having a short exposure time. The image pickup device 101 is driven by a pulse signal supplied from a timing pulse generator 112. A correlation double sampling (CDS) processing section 102 converts the video signal produced from the image pickup device 101 into a low-frequency signal. An automatic gain control (AGC) section 103 performs a gain control for the low-frequency signal produced from the CDS processing section 102. To expand the dynamic range, a knee processing section 104 compresses a signal whose brightness level is equal to or larger than a predetermined value. This is generally referred to as knee processing. The predetermined brightness level is a knee point which is a fixed value.

An A/D converter 105 receives a knee processed signal from the knee processing section 104 and converts this analog signal into a digital signal. A time axis converter 106 receives the digital signal from the A/D converter 105 and separates it into a long-term exposure signal and a short-term exposure signal. Each of the long-term exposure signal and the short-term exposure signal has a standard speed and a same timing. A mixing section 107 produces a mixed signal which is substantially the long-term exposure signal at a low-brightness region lower than the predetermined brightness level and substantially the short-term exposure signal at a high-brightness region higher than the predetermined brightness level. The low-brightness region and the high-brightness region of the mixed signal are smoothly connected at the boundary thereof. A gradation correcting section 108 corrects the gradation of the mixed signal. A main signal processing signal 111 receives a gradation corrected signal produced from the gradation correcting section 108.

An average brightness detecting section 109 detects an average brightness value based on the mixed signal. A microcomputer 110 inputs the average brightness value detected by the average brightness detecting section 109. The microcomputer 110 compares the detected average brightness value with a predetermined target brightness value. When the detected average brightness value is lower than the target brightness value, the microcomputer controls the AGC section 103 to increase the gain of AGC section 103, thereby increasing the level of a video signal. On the other hand, when the detected average brightness value is higher than the target brightness value, the microcomputer controls the AGC section 103 to decrease the gain of AGC section 103, thereby decreasing the level of a video signal. In this manner, to control the level of a video signal, the microcomputer 110 calculates an optimum gain to be set in the AGC section 103 and controls the gain of the AGC section 103 to the calculated value.

According to the above-described fundamental solid state imaging apparatus using the double-speed driven image pickup device, it is possible to expand the dynamic range by reducing the exposure time of the short-term exposure signal. However, when the exposure time is largely different between the long-term exposure signal and the short-term exposure signal, a variation of a signal responsive to a change of a light quantity does not match well between the long-term exposure signal and the short-term exposure signal. Thus, it becomes difficult to smoothly mix the long-term exposure signal and the short-term exposure signal. The exposure time of the long-term exposure signal is not larger than a difference between a vertical scanning time (=approximately 1/60 sec according to the NTSC system) and a blanking period (=approximately 1/1000 sec). Regarding the exposure time of the short-term exposure signal, the blanking period is maximized. To improve the dynamic range performance, it may be possible to reduce the exposure time of the short-term exposure signal to a level of 1/4000 sec, although it was limited to a level of 1/2000 sec. However, this will significantly reduce the smoothness of a mixing portion as well as deteriorate the gradation. In other words, shortening the exposure time of the short-term exposure signal results in deterioration of image quality in contradiction to the improvement of the dynamic range performance.

In view of the foregoing problem, improvement of the dynamic range performance essentially requires a system for smoothly mixing exposure signals without worsening the gradation at a mixing portion regardless of reduced exposure time of the short-term exposure signal and also without sacrificing improved effects of the dynamic range performance brought by the reduced exposure time of the short-term exposure signal.

Regarding the system for smoothly mixing the exposure signals, it is possible to reduce the knee point of the long-term exposure signal to a level lower than the mixing level only when enlargement of the dynamic range is necessary to pick up an image of an object. Next, the gain for the short-term exposure signal is increased while maintaining an allowable S/N level. Performing this processing prior to the mixing of the exposure signals makes it possible to equalize a variation of a signal responsive to a change of a light quantity to the same value between the long-term exposure signal and the short-term exposure signal. Namely, an inclination of each exposure signal with respect to the change of a light quantity can be substantially equalized in the vicinity of a mixing portion of the long-term exposure signal and the short-term exposure signal. Thus, smooth mixing of the exposure signals can be realized.

However, shortening the exposure time of the short-term exposure signal to improve the dynamic range may result in merely increasing the gain for the short-term exposure signal and losing the improved effects of the dynamic range performance. To avoid this, the knee point of the short-term exposure signal should be set to be higher than the mixing level. This is substantially equal to applying the pseudo gamma processing to the short-term exposure signal. In this case, as described previously, the knee point of the long-term exposure signal must be controlled independently. It is therefore necessary to provide a circuit arrangement capable of setting the knee points of the long-term exposure signal and the short-term exposure signal to different levels. Regarding the control of gain, the long-term exposure signal is controlled so that its gain is maximized when a low illuminance object is image picked up. However, the short-term exposure signal should not be controlled in the same manner.

More specifically, a picked-up image of an object may include both a low illuminance portion and a high illuminance portion. Furthermore, it may be so dark that the gain for the low illuminance portion must be increased. In such a case, the gain for the long-term exposure signal needs to be increased. However, if the gain for the short-term exposure signal is increased in the same manner, the S/N ratio of a high brightness portion of the picked-up image will be worsened unnecessarily. Namely, the gain control for the short-term exposure signal is characteristically different from that for the long-term exposure signal. Thus, the gain control for the short-term exposure signal should be performed primarily for realizing the smooth mixing of the exposure signals.

Accordingly, like setting for the knee point, setting for the gain must be performed independently for each of the long-term exposure signal and the short-term exposure signal.

However, according to the above-described fundamental solid state imaging apparatus, the long-term exposure signal and the short-term exposure signal are time sequentially produced from an image pickup device. This makes it impossible to independently set different gains at the AGC section and different knee points at the knee processing section for the long-term exposure signal and the short-term exposure signal.

To solve the above-described drawbacks, the present invention provides a solid state imaging apparatus capable of improving image quality of a mixed signal while improving the dynamic range performance by smoothly mixing the long-term exposure signal and the short-term exposure signal.

Figure 1:
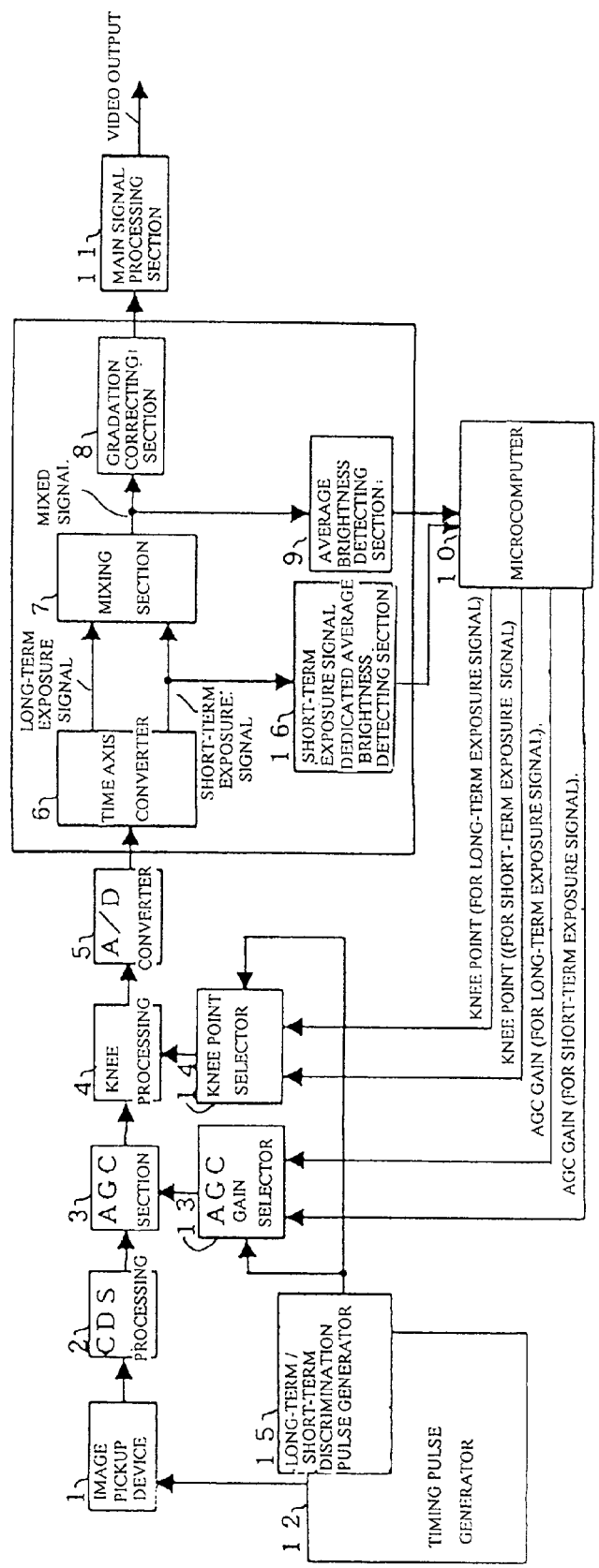
FIG. 1 is a diagram showing an arrangement for a knee point control and a gain control of a solid state imaging apparatus in accordance with a preferred embodiment of the present invention.

Hereinafter, a preferred embodiment of the present invention will be explained. FIG. 1 is a diagram showing an arrangement for a knee point control and a gain control of a solid state imaging apparatus in accordance with a preferred embodiment of the present invention.

In FIG. 1, an image pickup device 1 alternately outputs two kinds of video signals within a period of field at a transmission rate of a horizontal CCD which is two times an ordinary value. Of the two kinds of video signals produced from the image pickup device 1, one is a long-term exposure signal having a long exposure time and the other is a short-term exposure signal having a short exposure time. The image pickup device 1 is driven by a pulse signal supplied from a timing pulse generator 12. A correlation double sampling (CDS) processing section 2 converts the video signal produced from the image pickup device 1 into a low-frequency signal. An automatic gain control (AGC) section 3 performs a gain control for the low-frequency signal produced from the CDS processing section 2. To expand the dynamic range, a knee processing section 4 compresses a signal whose brightness level is equal to or larger than a predetermined value. This is generally referred to as knee processing.

According to the present invention, a set value for the gain of the automatic gain control (AGC) section 3 and a set value for the knee point of the knee processing section 4 are switched or changed for each of the long-term exposure signal and the short-term exposure signal. Thus, the present invention makes it possible to independently set the gain and the knee point for each of the long-term exposure signal and the short-term exposure signal. A gain selector 13 of the automatic gain control (AGC) section 3 sets a gain to be assigned to the automatic gain control (AGC) section 3. A knee point selector 14 sets a knee point to be assigned to the knee processing section 4.

Figure 3:
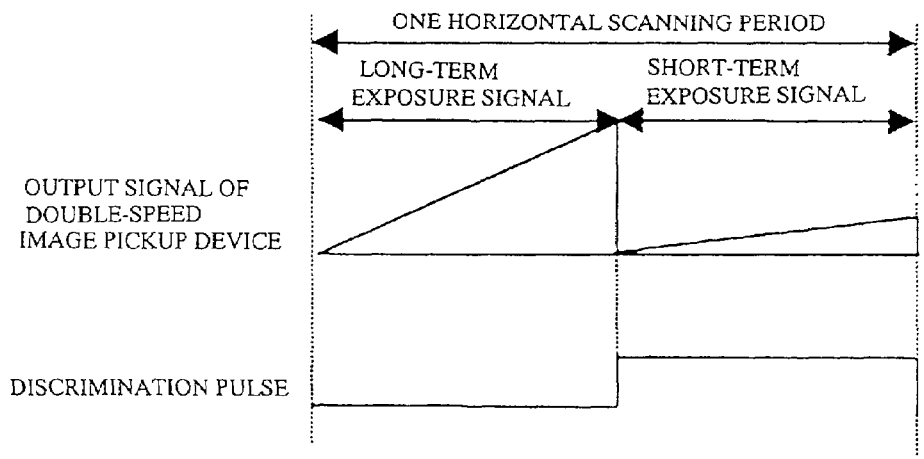
FIG. 3 is a timing chart showing a discrimination pulse for discriminating between a period for the long-term exposure signal and a period for the short-term exposure signal.

In this manner, the gain and the knee point can be set independently. A long-term/short-term discrimination pulse generator 15, which discriminates a period for a long-term exposure signal period from a period for a short-term exposure signal and vice versa, is incorporated in the timing pulse generator 12. FIG. 3 shows a discrimination pulse produced from the long-term/short-term discrimination pulse generator 15. This discrimination pulse serves as a switching signal for the selectors 13 and 14.

An A/D converter 5 receives a gain controlled and knee processed signal from the knee processing section 4 and converts this analog signal into a digital signal. A time axis converter 6 receives the digital signal from the A/D converter 5 and separates it into a long-term exposure signal and a short-term exposure signal. Each of the long-term exposure signal and the short-term exposure signal has a standard speed and a same timing. A mixing section 7 produces a mixed signal which is substantially the long-term exposure signal at a low-brightness region lower than the predetermined brightness level and substantially the short-term exposure signal at a high-brightness region higher than the predetermined brightness level. The low-brightness region and the high-brightness region of the mixed signal are smoothly connected at the boundary thereof.

Figure 5:
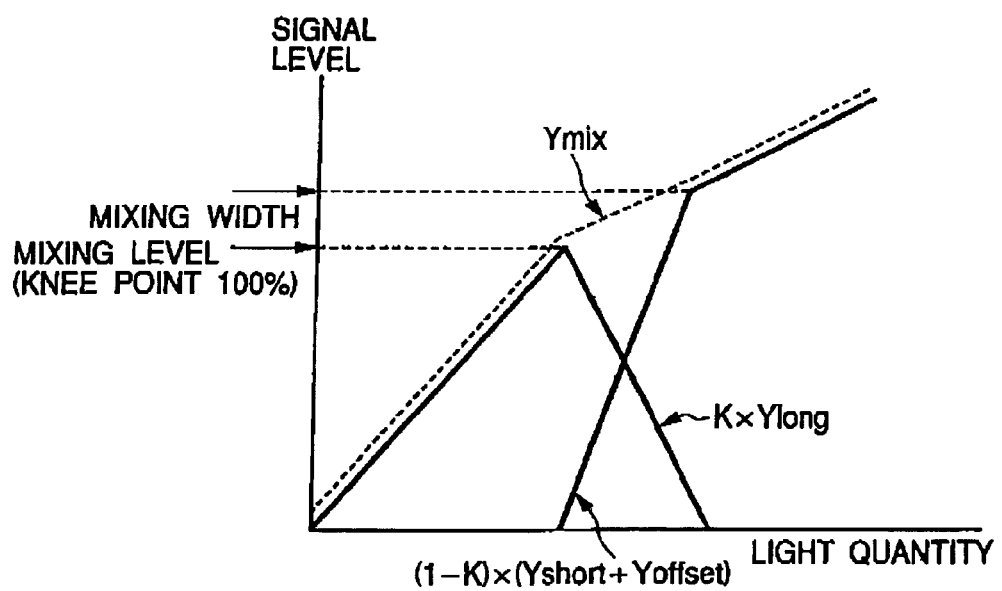
FIG. 5 is a graph illustrating a mixing operation of exposure signals performed the fundamental solid state imaging apparatus shown in FIG. 4.

FIG. 5 is a graph illustrating a mixing operation performed in accordance with the knee point control of the fundamental solid state imaging apparatus shown in FIG. 4.

A mixing level and a mixing width are regulated in such a manner that the mixing level is equalized to a 100% level at a final video output. The long-term exposure signal Ylong is multiplied with a gain K which starts compression at a region exceeding the mixing level, thereby obtaining a signal K×Ylong. The short-term exposure signal Yshort is added to an offset value Yoffset. Then, a sum signal (Yshort+Yoffset) is multiplied with a gain (1−K) which performs compression at a region below the mixing level, thereby obtaining a signal (1−K)×(Yshort+Yoffset). Then, both of the resultant signals are summed to obtain a mixed signal Ymix.

According to the above fundamental solid state imaging apparatus, the knee point level is a fixed value which is set in the vicinity of 100% level at the final video output. As described above, the 100% level is substantially equal to the mixing level.

According to the NTSC system, the exposure time of the long-term exposure signal is not larger than a difference between a vertical scanning time (=approximately 1/60 sec according to the NTSC system) and a blanking period (=approximately 1/1000 sec). Regarding the exposure time of the short-term exposure signal, the blanking period is maximized. The minimum exposure time of the short-term exposure signal is set to 1/2000 sec as a limit for maintaining the image quality of a mixing portion. To improve the dynamic range performance, it may be possible to reduce the exposure time of the short-term exposure signal to a level of 1/4000 sec from the fundamental level of 1/2000 sec. However, this will significantly reduce the smoothness of a mixing portion as well as deteriorate the gradation. According to the fundamental example which equalizes the mixing level with the knee point level, the relationship between an incident light quantity and a signal amount is expressed by the graph shown in FIG. 5, as the exposure time of the long-term exposure signal is approximately 1/60 sec, under the condition the exposure time of the short-term exposure signal is set to 1/2000 sec. Namely, a ratio of inclinations of two lines is equal to a ratio of two exposure times.

(Inclination of long-term exposure signal):(Inclination of short-term exposure signal)=1:1/32

Two lines can be mixed smoothly when the inclination of the long-term exposure signal is close to the inclination of the short-term exposure signal in the vicinity of a mixing point.

On the other hand, to improve the dynamic range performance, it is preferable to reduce the exposure time of the short-term exposure signal. When the minimum exposure time is reduced from the fundamental 1/2000 sec level to a 1/4000 sec level, the improvement of the dynamic range performance can be doubled. The ratio of inclinations of two lines in the vicinity of a mixing point becomes as follows.

(Inclination of long-term exposure signal):(Inclination of short-term exposure signal)=1:1/64

Thus, the image quality of the mixing portion is deteriorated.

Figure 2:
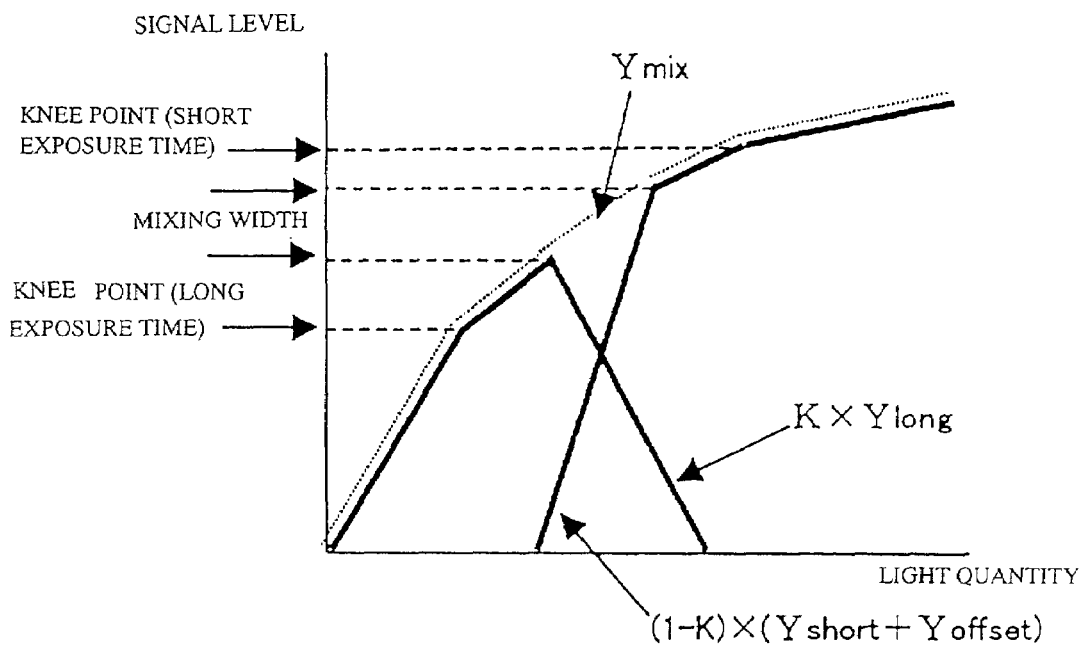
FIG. 2 is a graph illustrating a mixing operation of exposure signals performed in accordance with the knee point control and the gain control of the preferred embodiment of the present invention.

On the other hand, the above-described preferred embodiment of the present invention makes it possible to independently set the gain and the knee point for each of the long-term exposure signal and the short-term exposure signal. Accordingly, the knee point for the long-term exposure signal can be adjusted to an appropriate value. Independent of the long-term exposure signal, settings of the gain and the knee point of the short-term exposure signal can be performed adequately as shown in FIG. 2. Then, the two independently adjusted exposure signals are mixed.

First, the knee point of the long-term exposure signal is reduced from an ordinary 100% level to a 80% level only when an image picked-up object requires a dynamic range. A mixing level is maintained at the same 100% or to the vicinity thereof. Accordingly, the long-term exposure signal has the mixing point at a brightness level subjected to compression by the knee processing. The smoothness of a mixed signal is doubled compared with the above-described fundamental one.

The short-term exposure signal dedicated average brightness detecting section 16 detects an average brightness value of the short-term exposure signal. The microcomputer 10 inputs the detected average brightness value of the short-term exposure signal. Algorithm stored in the microcomputer 10 judges that an image picked-up object requires a dynamic range when the average brightness value of the short-term exposure signal is large. Thus, the microcomputer 10 performs a control for reducing the knee point of the long-term exposure signal.

Next, for the short-term exposure signal, its gain is fixed to a doubled level.

The setting of the gain for the short-term exposure signal is different from the setting of the gain for the long-term exposure signal. The setting of the gain for the short-term exposure signal is exclusively performed for improving the smoothness of the mixed signal. Meanwhile, it is general that the gain for the long-term exposure signal is controlled to a maximum value when the image picked-up object has a low illuminance. The similar gain control should not be applied to the short-term exposure signal. More specifically, a picked-up image of an object may include both a low illuminance portion and a high illuminance portion. Furthermore, it may be so dark that the gain for the low illuminance portion must be increased. In such a case, the gain for the long-term exposure signal needs to be increased. However, if the gain for the short-term exposure signal is increased in the same manner, the S/N ratio of a high brightness portion of the image will be worsened unnecessarily. Namely, the gain control for the short-term exposure signal is characteristically different from that for the long-term exposure signal. Thus, the gain control for the short-term exposure signal should be performed primarily for realizing the smooth mixing of the exposure signals. However, solely shortening the exposure time of the short-term exposure signal for the purpose of improving the dynamic range may result in losing the improved effects of the dynamic range, when the gain for the short-term exposure signal is fixed to the doubled value. To eliminate this drawback, the knee point for the short-term exposure signal is set to a point higher than the mixing level. In other words, the knee point for the short-term exposure signal is fixed to a level exceeding 100% at the final video output. This is substantially equal to applying the polygonal line gamma processing to the short-term exposure signal, as shown in FIG. 2. Thus, the smoothness of the mixed signal is doubled without losing the improved effects of the dynamic range.

As a result, the embodiment of the present invention makes it possible to attain quadruple improvement when the above-described gain and knee point control for the short-term exposure signal is combined with the knee point control for the long-term exposure signal. When the exposure time of the short-term exposure signal is 1/4000 sec, the ratio of inclinations of two lines in the vicinity of a mixing point becomes as follows.

(Inclination of long-term exposure signal):(Inclination of short-term exposure signal)=1:1/16

Thus, the improvement of the dynamic range performance is doubled compared with a fundamental one. At the same time, the smoothness of the mixed signal at the mixing portion is doubled compared with the above-described fundamental one.

A gradation correcting section 8 corrects the gradation of the mixed signal in such a manner that contrast of the gradation is emphasized when the histogram frequency of an image is large. A main signal processing signal 11 receives a gradation corrected signal produced from the gradation correcting section 8. An average brightness detecting section 9 detects an average brightness value based on the mixed signal. The microcomputer 10 inputs the average brightness value detected by the average brightness detecting section 9. The microcomputer 10 compares the detected average brightness value with a predetermined target brightness value. When the detected average brightness value is lower than the target brightness value, the microcomputer controls the AGC section 3 to increase the gain for the long-term exposure signal, thereby increasing the level of a video signal. On the other hand, when the detected average brightness value is higher than the target brightness value, the microcomputer controls the AGC section 3 to decrease the gain of AGC section 3, thereby decreasing the level of a video signal. In this manner, to control the level of a video signal, the microcomputer calculates an optimum gain to be set in the AGC section 3 and controls the gain of the AGC section 3 to the calculated value.

As described above, the present invention provides an arrangement for independently controlling the gain and the knee point for each of the long-term exposure signal and the short-term exposure signal, thereby realizing a smooth mixing of the long-term exposure signal and the short-term exposure signal. Thus, the present invention improves the dynamic range performance and also improves the image quality of the mixed signal.

When a picked-up image of an object comprises both a low illuminance portion and a high illuminance portion, it may be so dark that the gain for the low illuminance portion must be increased. In such a case, the gain for the long-term exposure signal is increased while the gain for the short-term exposure signal is fixed to the same value. Thus, the present invention makes it possible to prevent the S/N ratio of a high brightness portion of the image from being worsened.

As described above, the present invention provides a solid state imaging apparatus which expands the dynamic range by mixing two kinds of video signals which are different from each other in the exposure amount. The present invention provides an arrangement for independently controlling the gain and the knee point of each of the long-term exposure signal and the short-term exposure signal. With this arrangement, it becomes possible to provides an excellent solid state imaging apparatus capable of improving the image quality of a mixed signal as a result of smooth mixing of the long-term exposure signal and the short-term exposure signal while improving the dynamic range performance.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A solid state imaging apparatus comprising:
   an image pickup means for alternately outputting two kinds of video signals within a period of field, said two kinds of video signals being a long-term exposure signal having a long exposure time and a shod-term exposure signal having a short exposure time,
   a mixing means for mixing said long-term exposure signal and said short-term exposure signal at a predetermined mixing level, and a setting means for independently setting a gain and a knee point for each of said long-term exposure signal and said short-term exposure signal, wherein said setting means sets a knee point of said short-term exposure signal to a level higher than said mixing level of said long-term exposure signal and said short-term exposure signal.

2. The solid state imaging apparatus in accordance with claim 1, wherein said setting means comprises;

a long-term/short-term discrimination pulse generator which generates a signal discriminating between a period for said long-term exposure signal and a period for said short-term exposure signal; and a knee point setting means for setting a knee point, wherein a set value for the knee point of said knee point setting means is selected based on the discrimination signal generated from said long-term/short-term discrimination pulse generator, thereby independently setting the knee point for each of said long-term exposure signal and said short-term exposure signal in such a manner that a knee point of said short-term exposure signal is set to a level higher than said mixing level of said long-term exposure signal and said short-term exposure signal.

3. The solid state imaging apparatus in accordance with claim 2, wherein said setting means further comprises a gain setting means for setting a gain;

wherein a set value for the gain of said gain setting means is selected based on the discrimination signal generated from said long-term/short-term discrimination pulse generator, thereby independently setting the gain for each of said long-term exposure signal and said short-term exposure signal.

4. The solid state imaging apparatus in accordance with claim 1, further comprising:

a means for detecting an average brightness value of said short-term exposure signal to judge if an image picked-up object requires a dynamic range, and a microcomputer for performing an algorithm which is used to calculate said gain and said knee point based said detected average brightness value of said short-term exposure signal.

5. The solid state imaging apparatus in accordance with claim 1, wherein said setting means further sets a knee point of said long-term exposure signal to a level lower than said mixing level of said long-term exposure signal and said short-term exposure signal.

6. A solid state imaging apparatus comprising:

an image pickup means for alternately outputting two kinds of video signals within a period of field, said two kinds of video signals being a long-term exposure signal having a long exposure time and a short-term exposure signal having a short exposure time, a gain control means and a knee point control means provided for independently controlling a gain and a knee point of said two kinds of video signals, and a mixing means for receiving said two kinds of video signals being adjusted in the gain and the knee point by said gain control means and said knee point control means, and mixing said long-term exposure signal and said short-term exposure signal at a predetermined mixing level, wherein said knee point control means sets a knee point of said short-term exposure signal to a level higher than said mixing level of said long-term exposure signal and said short-term exposure signal.

7. The solid state imaging apparatus in accordance with claim 6, wherein said knee point control means farther sets a knee point of said long-term exposure signal to a level lower than said mixing level of said long-term exposure signal and said short-term exposure signal.

* * * * *